US007647419B2

(12) United States Patent
Deshpande

(10) Patent No.: US 7,647,419 B2
(45) Date of Patent: Jan. 12, 2010

(54) CLIENT-SIDE VIRTUAL RADIO STATION

(75) Inventor: Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1062 days.

(21) Appl. No.: 11/049,192

(22) Filed: Feb. 2, 2005

(65) Prior Publication Data

US 2006/0171374 A1 Aug. 3, 2006

(51) Int. Cl.
*G06F 15/16* (2006.01)

(52) U.S. Cl. ........................ 709/231; 709/203; 370/352

(58) Field of Classification Search ................. 709/231, 709/203; 370/352

See application file for complete search history.

(56) References Cited

U.S. PATENT DOCUMENTS

| | | | | |
|---|---|---|---|---|
| 5,359,601 | A | 10/1994 | Wasilewski et al. | |
| 5,581,576 | A | 12/1996 | Lanzetta et al. | 375/216 |
| 5,793,980 | A * | 8/1998 | Glaser et al. | 709/231 |
| 6,012,086 | A * | 1/2000 | Lowell | 709/218 |
| 6,081,780 | A * | 6/2000 | Lumelsky | 704/260 |
| 6,262,724 | B1 * | 7/2001 | Crow et al. | 715/723 |
| 6,539,210 | B1 * | 3/2003 | Heredia et al. | 455/154.1 |
| 6,654,367 | B1 * | 11/2003 | Kaufman | 370/356 |
| 6,725,022 | B1 | 4/2004 | Clayton et al. | 455/154.1 |
| 6,760,721 | B1 * | 7/2004 | Chasen et al. | 707/3 |
| 6,901,067 | B1 * | 5/2005 | Kalavade | 370/352 |
| 6,965,770 | B2 * | 11/2005 | Walsh et al. | 455/426.1 |
| 7,366,158 | B2 * | 4/2008 | Ishidoshiro | 370/352 |
| 7,409,205 | B2 * | 8/2008 | Mittal | 455/414.1 |
| 2002/0157034 | A1 | 10/2002 | Sagar | 714/4 |
| 2004/0039796 | A1 | 2/2004 | Watkins | 709/218 |

FOREIGN PATENT DOCUMENTS

| | | |
|---|---|---|
| EP | 0838915 | 4/1998 |
| WO | WO0079365 | 12/2000 |
| WO | WO01/35557 | 5/2001 |
| WO | WO0211441 | 2/2002 |
| WO | WO 2004/015896 | 2/2004 |

* cited by examiner

*Primary Examiner*—Simon Sing
(74) *Attorney, Agent, or Firm*—Law Office of Gerald Maliszewski; Gerald Maliszewski

(57) ABSTRACT

A system and method are provided for generating client-side virtual radio stations. The method comprises: receiving server-supplied radio stations at an network-connected radio service client; establishing radio filter characteristics; analyzing the server-supplied radio stations using the filter characteristics; generating a client-side virtual radio station service; supplying the virtual radio station service from a virtual radio station; and, presenting the virtual radio station services on a client-side user interface. The radio filter characteristics may be established using automatic, semi-automatic, or manual selection mechanisms. For example, characteristics may be selected automatically, as learned from an analysis of a user's past and present behavior. The radio filter characteristics may include criteria such as musical genre, song title, artist information, or server source, to name just a few.

14 Claims, 4 Drawing Sheets

Fig. 2

RADIO FILTER MODULE

125

| SELECTION MEANS | SELECTED CRITERIA | CRITERIA LIST |
|---|---|---|
| AUTOMATIC | SONG TITLE<br>ARTIST | GENRE<br>SONG TITLE<br>SONG DURATION<br>SONG ELAPSED TIME<br>⋮ |

Fig. 3

ENVIRONMENT MODULE

128

| SELECTED CRITERIA | CRITERIA LIST |
|---|---|
| CLIENT NETWORK CONNECTION SPEED<br><br>CURRENT TIME | CLIENT CAPABILITY<br>CLIENT NETWORK CONNECTION SPEED<br>CLIENT NETWORK CONNECTION TYPE<br>CURRENT TIME<br>CURRENT DATE<br>⋮ |

TO Fig. 4B

CLIENT-SIDE VIRTUAL RADIO STATION

BACKGROUND OF THE INVENTION

1. Field of the Invention

This invention generally relates to Internet-related communications and, more particularly, to a system and method for managing a client-side, or virtual Internet radio station.

2. Description of the Related Art

As noted in US publication 2002/0157034, Internet Radio involves streaming data content from a server over the Internet to a listener. Sometimes, data may be downloaded in advance to a listener cache for faster playback later. However, since the term "Internet radio" is commonly used in the art, it will be used here as well. Typically, the content for the Internet radio station will include voice and music.

Real-time streaming of content is effected by programs such as RealAudio™, produced by RealNetworks, Inc. Other Internet Radio services include Radio@AOL and Radio@Netscape. RealOne player supports a variety of free and superpass radio channels. Windows Media player has a Radio tuner, which permits a user to "tune" into number of radio stations.

This streaming is usually of highly compressed data content, to allow the audio to be received over dial-up connections in the consumer's home. The dial-up is typically less than 56 kbit/s bandwidth, which means a very high compression ratio is required compared to the "original" CD source material (44.1 ksample/s ×16 bits/sample ×2 channels). Higher bitrate streams can be sent from the Internet Radio, for example, if a broadband network connection is used by the consumer.

Internet "radio stations" differ from traditional "broadcast" stations, as the Internet-based station is not sent out as a broadcast stream. This means that each person who connects to the station, connects to a unique socket and is delivered an independent "stream", over UDP (User datagram protocol), TCP (transport control protocol), or RTP (real-time transport protocol). Consequentially, the load on the server increases in proportion to the number of listeners who are accessing the station.

The client devices that receive Internet radio services, for presentation to the user, typically have a great deal of processing power and memory. Yet these clients present the Internet radio stations with no greater user control options than a conventional AM/FM radio.

It would be advantageous if a user had greater control over the content presented by Internet radio services.

It would be advantageous if a user could select from the content provided by the above-mentioned Internet radio stations to create their own virtual radio station.

SUMMARY OF THE INVENTION

Conventionally, a client device such as a personal computer (PC) or entertainment system, acts as the interface between the user and server-supported Internet radio stations. Thus, if the server supports N number of radio stations, then the conventional client simply presents the user with the choice of N stations. The present invention client-side virtual radio station is an intelligent client, which creates virtual station services for presentation to the user. This intelligent client, referred to herein as a virtual radio station (VRS), may present more than N radio stations to the user, even when only N stations are made available by the server. The virtual station services can be created by the VRS and presented to the user in the same manner as the "real" stations supported by the server.

The virtual radio station services can be created by the VRS entirely automatically. The virtual radio station services can be created by the VRS based upon the user configuration data. The virtual radio station services can be engaged by the user in exactly the same manner as the server-supplied radio stations. The VRS creates virtual stations that permit a user to navigate and access Internet radio service resources with greater control. These virtual station services can be created by the VRS without any special support from the server. In fact, the server does not even need to be aware of the VRS or the virtual station services.

Accordingly, a method is provided for generating client-side virtual radio stations. The method comprises: receiving server-supplied radio stations at an network-connected radio service client; establishing radio filter characteristics; analyzing the server-supplied radio stations using the filter characteristics; generating a client-side virtual radio station service; supplying the virtual radio station service from a virtual radio station; and, presenting the virtual radio station services on a client-side user interface.

The radio filter characteristics may be established using automatic, semi-automatic, or manual selection mechanisms. For example, characteristics may be selected automatically, as learned from an analysis of a user's past and present behavior. The radio filter characteristics may include criteria such as musical genre, song title, artist information, or server source, to name just a few.

In another aspect, the method establishes environmental criteria such as client capability, client network connection speed, or client network connection type. Then, an analysis of the server-supplied radio stations uses the established environmental criteria.

In another aspect, the method stores the list of virtual radio station services in client-side memory, or with a network-connected server memory. The user can access the stored list of virtual radio station services, and edit the list. To aid in the recall process, names can be assigned to the virtual radio station services.

Additional details of the above-described method, and a system for generating client-side virtual radio stations, are provided below.

BRIEF DESCRIPTION OF THE DRAWINGS

FIG. 2 is a diagram depicting a radio filter module.

FIG. 3 is a diagram depicting an environment module.

DETAILED DESCRIPTION

Figure 1:
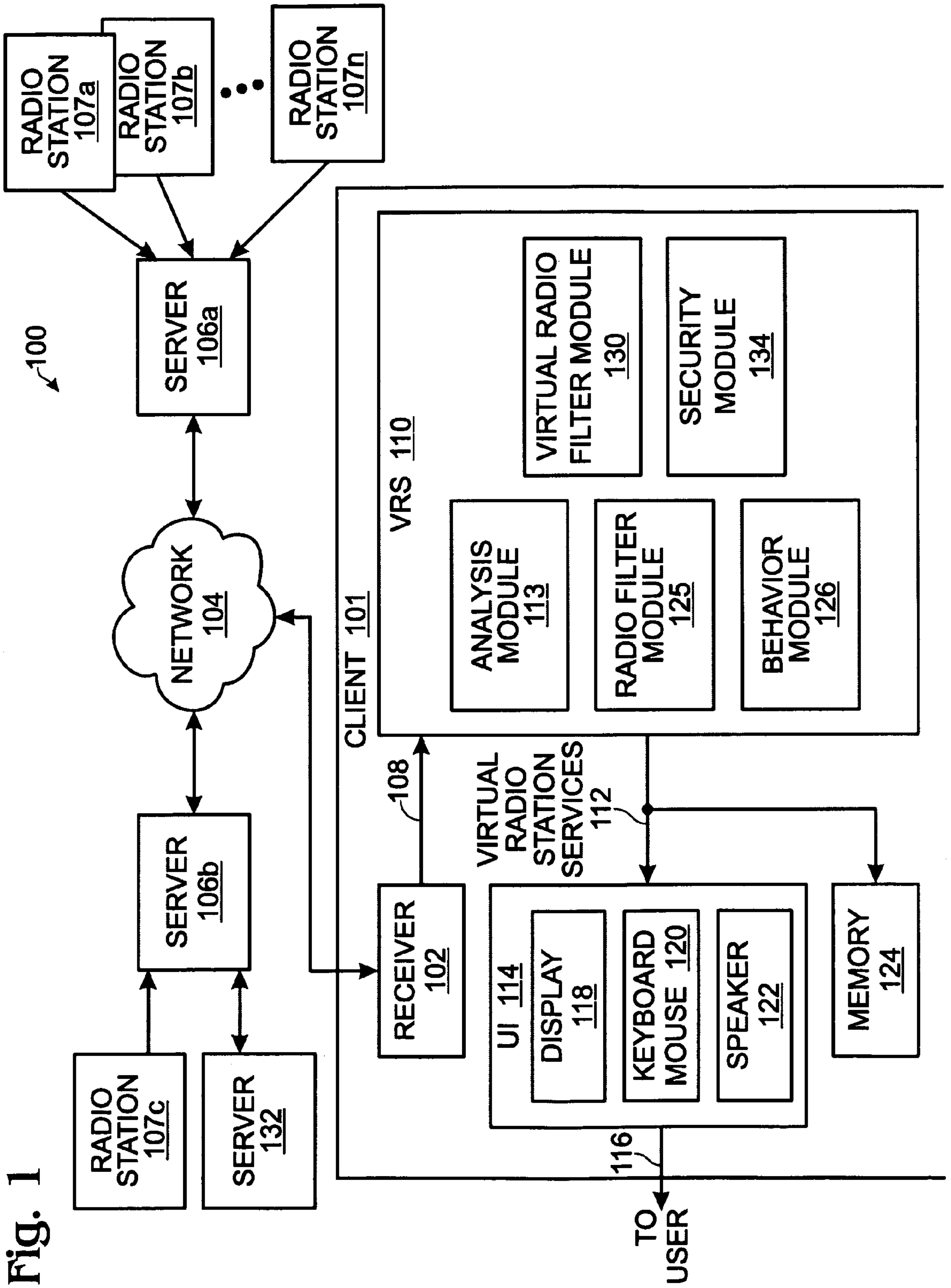
FIG. 1 is a schematic block diagram of a system for generating client-side virtual radio station services.

FIG. 1 is a schematic block diagram of a system for generating client-side virtual radio station services. The system 100 comprises a client 101, with a radio service client receiver 102 having an interface connected to a network 104 for receiving server-supplied transmissions. In this case, the transmissions are Internet radio stations. The client 101 can be a personal computer, a wireless telephone, home entertainment system, television, or any device capable of supporting network communications. Generally, the network 104 may be referred to as "the Internet". More particularly, the network 104 is any hardwired, optical, wireless, or combination of the above-mentioned media, that support communication protocols such as UDP, TCP, RTP, or the like. The network is shown connected to servers 106a and 106b. The server 106a is supplying conventional Internet radio stations 107a, 107b, and 107n. Server 106b is supplying radio station 107c. The invention is not limited to any particular number of Internet radio stations. Neither is the invention limited to communications with any particular number of servers.

The receiver 102 decodes the server-supplied radio stations and supplies the server-supplied radio stations at an output on line 108. That is, the services associated with stations 107a, 107b, 107c, and 107n, are supplied by the receiver 102, on line 108, simultaneously. For example, the receiver 102 may decode and decompress the content transmitted by the radio stations. A virtual radio station (VRS) 110 has an interface locally connected to the receiver 102 on line 108, to accept the server-supplied radio stations. The VRS 110 has an interface on line 112 to supply client-side virtual radio station services in response to analyzing the server-supplied radio transmissions. The analysis is enabled with analysis module 113. To minimize confusion with the terms, the virtual radio station 110, with its various functions, is referred to herein as a "station", while the content being supplied by the station 110 (on line 112) is referred to herein as a "VRS service". Although only a single VRS 110 is shown that is capable of supplying a plurality of VRS services, in other aspects of the system, a unique VRS may exist for each VRS service.

In one aspect, the system 100 further comprises a client-side user interface (UI) 114 having an interface connected to the virtual radio station on line 112 to receive the virtual radio station services. The client-side UI 114 has an output on line 116 to present the virtual radio station services to a user. The client-side UI 114 may include elements of software applications (not shown), memory (not shown), an audio amplifier (not shown), display 118, keyboard/mouse 120, and speaker 122. Alternately, the VRS 110 may supply virtual radio station services to a memory 124.

FIG. 2 is a diagram depicting a radio filter module. Viewing both FIGS. 1 and 2, the virtual radio station 110 establishes radio filter characteristics, represented with radio filter module 125. The VRS 110 (analysis module 113) uses the filter characteristics to analyze the server-supplied radio stations on line 108. The virtual radio station 110 establishes radio filter characteristics using automatic, semi-automatic, or manually selection mechanisms. Manual radio filter characteristics are input via the client-side user interface 114. The virtual radio station 110 may include a behavior module 126 that enables the automatic selection mechanism, to select characteristics learned from an analysis of a user's past and present behavior. Alternately, the virtual radio station 110 selects characteristics (automatically) learned from an analysis of a user's past and present behavior, using the behavior module 126, as well as criteria manually input via the client-side user interface 114. An example of semi-automatic selection criteria may be the use of the UI 114 to program the behavior module 126, to perform an analysis of song titles previously presented to the user.

Generally, the virtual radio station 110 uses filter characteristics such as musical genre, song title, song duration, song elapsed time, song remaining time, ratings, artist information, album information, nationality, performer, server source, server-supplied radio station, preset selections, recording date, composition date, language, religious affiliation, content (i.e., weather as opposed to music), and combinations of the above-mentioned criteria. Other radio filter characteristics are possible. Generally, these characteristics relate to the service content.

FIG. 3 is a diagram depicting an environment module. Viewing FIGS. 1 and 3, the virtual radio station 110 establishes environmental criteria, enabled with an environment module 128, and analyzes the server-supplied radio stations on line 108 using the established environmental criteria. The environmental criteria may be considerations such as client capability (applications embedded, processing power, and memory), client network connection speed, client network connection type, current time and date, and combinations of the above-mentioned criteria. Other criteria are possible. Generally, the environmental criteria concern hardware, software, and user availability. As with the radio filter characteristics, the virtual radio station 110 may use an environmental criteria selection mechanism that is automatically, semi-automatically, manually inputs via the client-side user interface 114, or selects using combinations of the above-mentioned criteria.

Just as a server may supply a plurality of Internet radio services, the VRS 110 may supply a plurality of virtual radio station services. For example, the virtual radio station 110 may additionally establish virtual radio filter characteristics, represented by virtual radio filter module 130. Although not depicted in detail, the virtual filter module 130 may be similar to the radio filter module of FIG. 2. The VRS 110 generates a second virtual radio station service in response to filtering a first virtual radio station service. More specifically, the virtual radio station 110 generates the second virtual radio station service by initially filtering the server-supplied radio stations, and generating the first virtual radio station service. Subsequently, The VRS 110 filters the first virtual radio station service, and generating the second virtual radio station service.

For example, Dad has created a first virtual station service for himself based on his favorite artists. He wants to create another virtual station service, from this first virtual station service, for his kid. This second virtual station service is same as the first, except that it filters out songs with explicit lyrics. Other examples like this are possible. For example, a husband may create a virtual station service for himself based upon his favorite artists, and then create another virtual station service for his wife from his own virtual station service, except that an artist is omitted, who the husband knows is not enjoyed by his wife.

In one aspect, the receiver 102 decodes server-supplied radio stations that include auxiliary information such as media data and/or metadata. Then, the virtual radio station 110 filters the decoded auxiliary information and generates a virtual radio station service supplying the filtered auxiliary information. The virtual radio station service may supply a video as auxiliary information accompanying a sound track. The media data information can be audio, image, video, text data, and combinations of the above-mentioned types of information. The metadata information is typically associated with the media data, and includes information such as title, artist, album name, album art, links for obtaining media data, links for obtaining additional metadata, time/date when media data began playing, duration of media data, remaining duration of media data, elapsed duration of media data, links for buying media data, media data bit rate, media data format, media data payload information, media data ratings, or media data reviews. Other types of media data and metadata are possible.

In another aspect, the client-side user interface 114 has an output (i.e. display 118) to present a list of virtual radio station services supplied by the virtual radio station 110, and an input (i.e. keyboard/mouse 120) to receive virtual radio station service selections. In this manner, the client-side user interface 114 presents the selected virtual radio station service. In one aspect, the memory 124 may receive data for storage from the virtual radio station 110, such as the above-mentioned list of virtual radio station services. Memory 124 is shown embedded with the client 101. Alternately, the list can be stored in a memory 132, which is embedded with the network-connected server 106*b*.

If the memory 124/132 is persistent, the virtual radio station may generate a service by accessing a service created in a previous session. That is, VRS 110 may generate virtual radio station services in a first session, and store the list of virtual radio stations created in the first session in the persistent memory 124/132. After terminating the first session and initializing a second session subsequent to the first session, the VRS 110 may access the list of virtual radio stations created in the first session from the persistent memory 124/132.

The virtual radio station 110 can establish identification criteria such as a username, password, PIN, or the like, enabled with security module 134. The VRS 110 associates the stored list of virtual radio station services with the identification criteria, and accesses the stored list of virtual radio station services in response to receiving associated identification criteria via the client-side user interface. Thus, only the user, or a group allowed by the user, can access the stored service list. Using this process, neither the VRS 110 (automatically) or the user (manually) need invent a service, as the filter criteria already exist in memory.

In one aspect, the virtual radio station 110 accesses the stored list of virtual radio station services and receives commands for editing the list via the client-side user interface 114. In this manner, the radio filter criteria can be modified, without starting a new list of filter criteria from scratch. For example, a user can modify their "'60's music station" to exclude songs by The Beatles. In another aspect, the virtual radio station 110 receives name selections via the client-side user interface 114, and in response to the selections, assigns names to the virtual radio station services. The names may be used to help a user quickly identify a service using a particular mix of filters. Alternately, the virtual radio station 110 may automatically assign names to the virtual radio station services.

In another aspect, the client-side user interface 114 simultaneously presents a list of server-supplied radio stations and virtual radio station services. In one variation, the list differentiates the virtual radio station services from the server-supplied radio stations. In another variation, the user interface 114 presents a combined list of server-supplied radio stations and virtual radio station services. The virtual radio station 110 may dynamically add and remove server-supplied radio stations and virtual radio station services, to and from the combined list of radio stations presented at a client-side user interface 114, in response to commands entered via the client-side user interface.

In one aspect, the virtual radio station 110 initially supplies media data decoded from a first server-supplied radio station, and subsequently supplies media data decoded from a second server-supplied radio station. That is, a virtual radio station service may combine media data from different server-supplied Internet radio stations. In a different aspect, the client-side memory 124 includes stored media date. The virtual radio station 110 may analyze the media data stored in the client-side memory 124 and generate a virtual radio station service using a combination of analyzed server-supplied radio services and analyzed media data from the client-side memory 124. For example, if a user establishes an all "Blink 182" service, the VRS 110 may play songs stored in memory 124, whenever appropriate material is not being played on any of the server-supplied radio stations.

In another aspect, the virtual radio station 110 establishes service criteria, enabled by service criteria module 136. The service criteria may include user configuration, server, capability, or user subscription. Other service criteria are possible. Generally, the service criteria are associated with content source limitations. Then, the VRS 110 generates a virtual radio station service in response to the service criteria. For example, the VRS 110 may only analyze material supplied by higher quality-of-service servers, to which the user pays a subscription fee.

Functional Description

Details of the above-mentioned client-side virtual radio station will be illustrated in the form of an example. Mary has an IP-connected Sharp Aquos™ television with an installed client-side virtual radio station for Internet radio service. The Internet radio service supports a total of 100 radio stations in 8 different genres. A conventional Internet radio service client presents Mary with a list of all the 100 radio stations and she can interact with the stations using the features supported by the radio service.

In contrast, using the client-side virtual radio station, Mary is presented with a list of 105 radio stations. This includes all the 100 regular (server-supplied) Internet stations available from the radio service. In addition, 5 virtual radio station services are shown – automatically generated, based on Mary's configuration. Using the client-side virtual radio station, Mary can interact with all the 105 (100 actual+5 virtual) radio stations in the same manner. The server is not aware of these virtual radio stations. A virtual radio station service can be created by the client, such that it appears to the user to be the same as a server-supplied radio station. Alternately, the client may distinguish the virtual radio station service and present it to the user in a different manner than server-supplied radio stations.

The client may create the virtual stations using any of the following approaches:

Entirely Automatically, and/or

Semi-automatically based on the user configuration, and/or

Manually based on the user request.

With automatic virtual radio station service creation, the VRS may create virtual station services entirely automatically. For example, the following types of virtual stations can be created.

Genre Based:

A virtual station service created from a combination of all (or alternatively any two or more) radio stations presenting material from a particular genre.

Preset Based:

A virtual radio station service created from a combination of all the server-supplied radio stations, selected from the user's preset radio station list. The preset radio stations are set by the user using an approach defined and supported by the conventional Internet radio service.

The VRS may create virtual station services semi-automatically. The following types of virtual station services can be created.

User Preference Based:

A virtual station service can be created by the VRS using the user preference information. As an example, if the user likes a certain genre, then the client side may create virtual radio station services only from the combination of the radio stations in that genre. Similarly, if the user has provided a preference for one or more artists (or the client has automatically learnt about user preferences), then the client can create a radio station service that provide only the songs from those selected artists. The virtual radio station may monitor the server-supplied radio stations, matching the currently playing songs against the user preference. In this case, a virtual radio station may only be intermittently active.

The VRS may create virtual station services manually, based on the user requests. The following types of virtual station services can be created.

Combination Based:

The user may specify a list of server-supplied and/or virtual station services, which they want the client to use in the creation of a virtual station service. The server-supplied stations may belong to the same/different genres. The virtual station service may include other virtual station services.

Thus, a virtual station service is created as a combination, and based on some rules regarding the server-supplied stations. The virtual station service may be created to include either, or both of the media data and the metadata provided by the server-supplied stations.

The VRS may treat the virtual station services in the same manner as the server-supplied radio stations. The VRS may list the virtual station services together with the server-supplied radio stations. The VRS may allow the user to interact with the virtual station services in the same manner that the user interacts with the server-supplied stations, to receive the streaming media for that station. The VRS may support storing the list of the virtual station services persistently across different sessions. Thus, the same user name that is used for accessing Internet radio stations, can be used to interact with the virtual radio station services. The client may save the virtual station service list locally. Alternately or in addition, the client may store the list on the server as user configuration information for the user name accessing the Internet radio service. This permits the VRS to support the same virtual station services on another client device, if the user accesses the Internet radio service from different client devices.

The VRS may add to the list of the current virtual radio station services, by creating new virtual radio station services, deleting existing virtual radio station services, or modifying an existing virtual radio station service. The VRS may automatically provide a name for a virtual radio station service. In some embodiments, the VRS may permit the user to rename the virtual radio station service to a user-assigned name.

Alternately, the VRS may show virtual radio station services to the user as being distinct from the server-supplied radio stations. This may be done for branding purposes. In some aspects, the virtual radio station services may be shown in a separate list, distinct from the server-supplied radio stations. The virtual radio station services may be visually distinguished in the list of supported radio station. This may be done, for example, by using a different foreground/background color, font (size, family, style, etc.), icon, image, or the like. The virtual radio station services may be dynamically added and removed in the list of supported radio stations. The virtual radio stations may support only some features, as compared to a server-supplied radio station. Alternatively, the virtual radio station service may support features that are generated in addition to the features supported by the server-supplied radio station.

For example, the server may not allow a user to skip a currently playing song, to jump to the next song, if the user does not like song currently being played on a server-supplied radio station. Since the virtual station is typically created from more than one server-supplied radio station, the VRS may support a song skipping feature. The VRS may enable this feature by changing from one server-supplied radio station to another. But from the user's point of view, the VRS skips the song. This may also be accomplished by the VRS simultaneously receiving/recording multiple server-supplied stations (e.g. of the same genre) to support this feature.

The VRS may use some rules and/or put some restrictions on the creation of the virtual radio station services. The VRS may put some restrictions on the user-assigned names for virtual radio station services. For example, checks can be make to ensure that two virtual radio station services do not have the same name, or that a name consists of valid characters. The VRS may put a restriction on the maximum number of virtual station services that can be created by/for a user. This may include a tiered approach, where a "basic" subscription to the Internet radio service may allow the user to generate a certain number of virtual radio station services, and an "plus" subscription for the Internet radio service may permit the user to create an unlimited number of virtual radio station services.

Figure 4A:
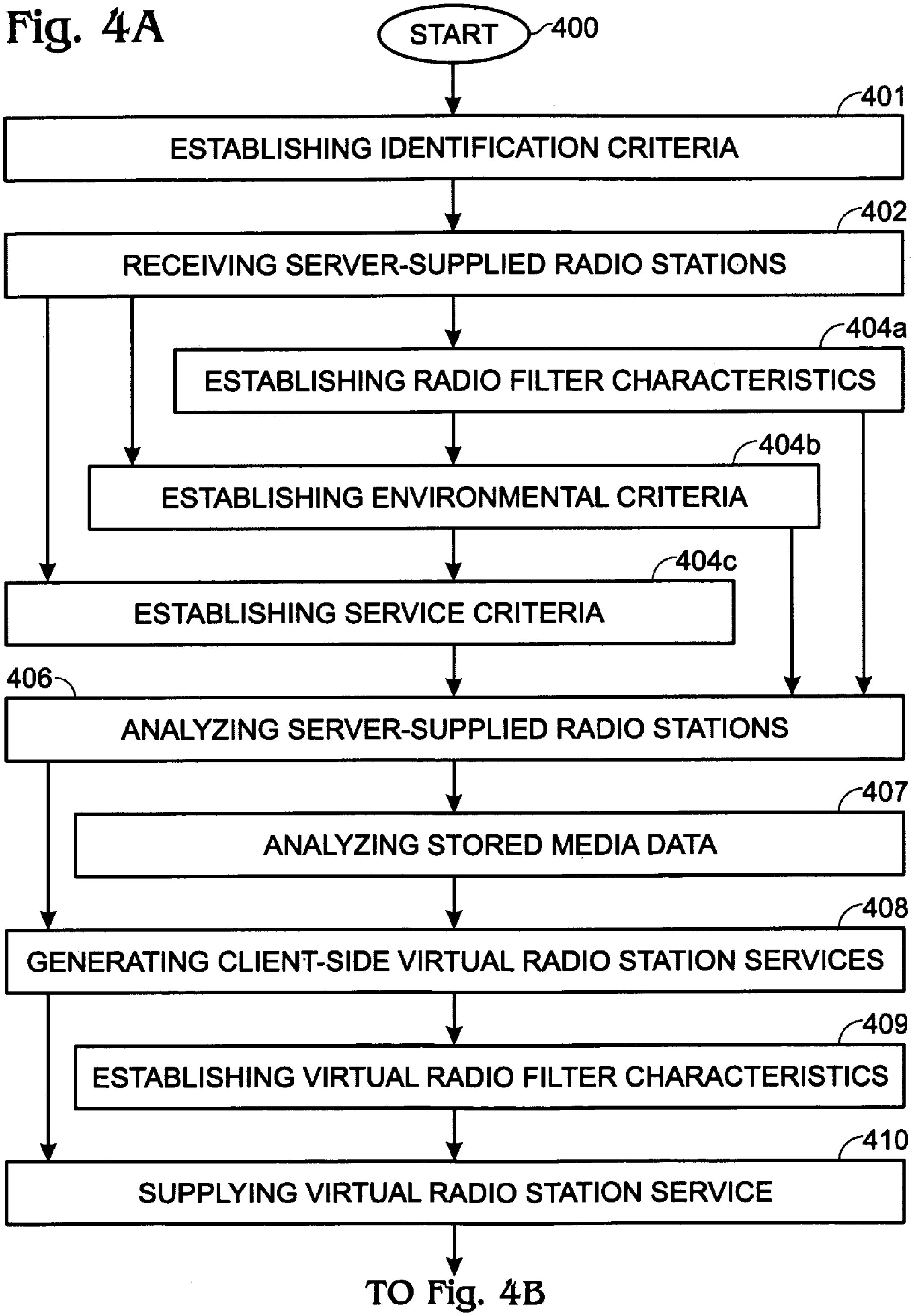
FIGS. 4A and 4B are flowcharts illustrating a method for generating client-side virtual radio station services.
Figure 4B:
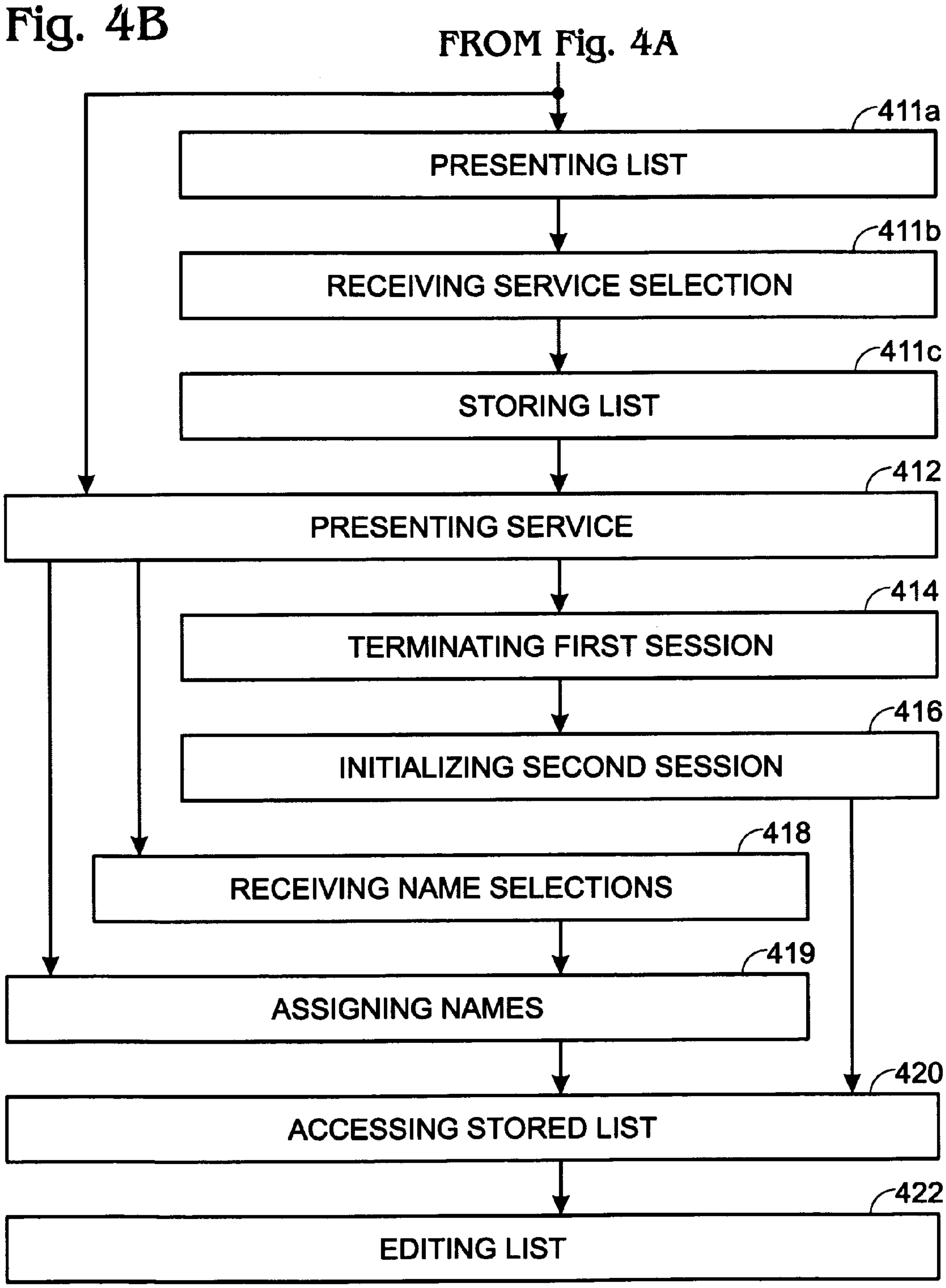

FIGS. 4A and 4B are flowcharts illustrating a method for generating client-side virtual radio station services. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. Details of the flowchart may be understood in the context of the explanation of FIGS. 1-3, above. The method starts at Step 400.

Step 402 receives server-supplied radio stations at a network-connected radio service client. The radio stations may be received from a plurality of Internet-connected servers. Likewise, transmissions are typically received at an Internet-connected radio service client. Step 406 analyzes the server-supplied radio stations. Step 408, using the analyzed server-supplied radio stations, generates a client-side virtual radio station service. Step 410 supplies the virtual radio station service from a virtual radio station. Step 412 presents the virtual radio station service on a client-side user interface.

In one aspect, Step 404*a* establishes radio filter characteristics. Then, the analysis of Step 406 is responsive to the radio filter characteristics. Establishing radio filter characteristics in Step 404*a* includes establishing radio filter characteristics using an automatic, semi-automatic, or manual selection mechanism. When using an automatic selection mechanism, characteristics are selected that are learned from an analysis of a user's past and/or present behavior. In addition to an analysis of a user's past and present behavior, criteria can manually selected by the user. That is, the automatic and manual selection mechanisms can be combined.

Some examples of radio filter characteristics include musical genre, song title, song duration, song elapsed time, song remaining time, ratings, artist information, album information, nationality, performer, server source, server-supplied radio station, preset selections, recording date, composition date, language, religious affiliation, content, and combinations of the above-mentioned criteria.

In another aspect, Step 404*b* establishes environmental criteria. Then, analyzing the server-supplied radio stations in Step 406 includes analyzing the server-supplied radio stations using the established environmental criteria. Examples of environmental criteria include client capability, client network connection speed, client network connection type, current time and date, and combinations of the above-mentioned criteria. Step 404*b* may establish environmental criteria using a selection mechanism such as automatic, semi-automatic, manual selection criteria, or combinations of the above-mentioned criteria.

In another aspect, Step 409 establishes virtual radio filter characteristics. Then, generating the client-side virtual radio station service in Step 408 includes generating a second virtual radio station service in response to filtering a first virtual radio station service. More specifically, generating the second virtual radio station service in Step 408 includes: initially filtering server-supplied radio stations, generating the first virtual radio station service; and, subsequently filtering the first virtual radio station service, generating the second virtual radio station service.

In one aspect, receiving server-supplied radio stations in Step 402 includes receiving server-supplied radio stations with auxiliary information such as media data and/or metadata. Then, analyzing the server-supplied radio stations in Step 406 includes filtering the received auxiliary information, and generating the client-side virtual radio station service in Step 408 includes generating a virtual radio station service supplying filtered auxiliary information. Examples of media data information include audio, image, video, text data, and combinations of the above-mentioned information. In one aspect, supplying virtual radio station services from the virtual radio station in Step 410 includes: initially supplying media data received from a first server-supplied radio station; and, subsequently supplying media data received from a second server-supplied radio station.

Typically, metadata information is associated with the media data, and some examples include title, artist, album name, album art, links for obtaining media data, links for obtaining additional metadata, time/date when media data began playing, duration of media data, remaining duration of media data, elapsed duration of media data, links for buying media data, media data bit rate, media data format, media data payload information, media data ratings, and media data reviews.

In one aspect, Step 411*a* presents a list of virtual radio station services at a client-side user interface. Step 411*b* receives a virtual radio station service selection. Then, Step 412 presents the selected virtual radio station service. Step 412 may simultaneously present a list of server-supplied radio stations, while differentiating the virtual radio station services from the server-supplied radio stations. Alternately, a combined list of server-supplied radio stations and virtual radio station services is presented. In another aspect, Step 412 dynamically adds and removes virtual radio station services to and from the combined list of virtual radio station services presented at a client-side user interface in response to user interface commands.

In a different aspect, Step 411*c* stores the list of virtual radio station services. The storage location can be a client-side memory, a network-connected server memory, or some other persistent storage. Step 420 accesses the stored list of virtual radio station services. Step 422 edits the list.

For example, Step 408 may generate virtual radio station services in a first session, and Step 411*c* stores the list of virtual radio station services created in the first session in persistent storage. Then, Step 414 terminates the first session. Step 416 initializes a second session, subsequent to the first session. Then, Step 420 accesses the list of virtual radio station services created in the first session.

In another aspect, Step 401 establishes identification criteria such as a username and a password. Then, Step 411*c* associates a stored list with identification criteria, and Step 420 accesses the stored list of virtual radio station services in response to supplying the associated identification criteria.

In one aspect, Step 418 receives name selections at a client-side user interface, and Step 419, in response to the selections, assigns names to the virtual radio station services. Alternately, Step 419 automatically assigns names to the virtual radio station services.

In another aspect, Step 407 analyzes media data stored in a client-side memory. Then, generating the client-side virtual radio station service in Step 408 includes generating a client-side virtual radio station service using a combination of analyzed server-supplied radio stations (Step 406) and analyzed media data from memory (Step 407).

In one aspect, Step 404*c* establishes service criteria such as user configuration, server, capability, and user subscription. Then, generating the client-side virtual radio station service in Step 408 includes generating a client-side virtual radio station service in response to the service criteria.

A system and method have been provided for generating a client-side virtual radio station that supplies virtual radio station services. Examples of filter criteria and management processes have been given to illustrate the invention. However, the invention is not limited to merely these examples. Other variations and embodiments of the invention will occur to those skilled in the art.

I claim:

1. A system for generating client-side virtual radio station services, the system comprising:

a radio service client receiver having an interface connected to a network for receiving a plurality of server-supplied transmissions, the receiver decoding the server-supplied transmissions and supplying received radio transmissions at an output; and a virtual radio station having an interface locally connected to the receiver to accept the server-supplied radio stations, the virtual radio station analyzing the content of the server-supplied radio stations using established radio filter characteristics, selecting content from the server-supplied radio stations, and combining the selected content from the server-supplied radio stations into a client-side virtual radio station service, the virtual radio station having a user interface to present a list of the selected content as stations in the client-side virtual radio station service.

2. The system of claim 1 wherein the virtual radio station establishes radio filter characteristics using a selection mechanism chosen from the group including automatic, semi-automatic, and manually input via the client-side user interface.

3. The system of claim 2 wherein the virtual radio station uses the automatic characteristics selection mechanism to select characteristics learned from an analysis of a user's past and present behavior.

4. The system of claim 2 wherein the virtual radio station uses filter characteristics selected from the group including musical genre, song title, song duration, song elapsed time, song remaining time, ratings, artist information, album information, nationality, performer, server source, server-supplied radio station, preset selections, recording date, composition date, language, religious affiliation, content, and combinations of the above-mentioned criteria.

5. The system of claim 1 wherein the virtual radio station establishes environmental criteria and analyzes the server-supplied radio stations using the established environmental criteria.

6. The system of claim 5 wherein the virtual radio station establishes environmental criteria selected from the group including client capability, client network connection speed, client network connection type, current time and date, and combinations of the above-mentioned criteria.

7. The system of claim 6 wherein the virtual radio station establishes an environmental criteria selection mechanism chosen from the group including automatic, semi-automatic, manually input via the client-side user interface, and combinations of the above-mentioned criteria.

8. The system of claim 2 wherein the virtual radio station additionally establishes virtual radio filter characteristics, and generates a second virtual radio station service in response to filtering a first virtual radio station service.

9. The system of claim 1 wherein the receiver decodes server-supplied radio stations that include auxiliary information selected from the group including media data and metadata; and wherein the virtual radio station filters the decoded auxiliary information and generates a virtual radio station service supplying the filtered auxiliaiy information.

10. The system of claim 9 wherein the receiver decodes media data information selected from the group including audio, image, video, text data, and combinations of the above-mentioned information.

11. The system of claim 9 wherein the receiver decodes metadata information, associated with the media data, selected from the group including title, artist, album name, album art, links for obtaining media data, links for obtaining additional metadata, time/date when media data began playing, duration of media data, remaining duration of media data, elapsed duration of media data, links for buying media data, media data bit rate, media data format, media data payload information, media data ratings, and media data reviews.

12. The system of claim 1 further comprising:

a client-side memory including stored media date, connected to the virtual radio station; and wherein the virtual radio station analyzes the media data stored in a client-side memory and generates a virtual radio station service using a combination of analyzed server-supplied radio stations and analyzed media data from the client-side memory.

13. The system of claim 1 wherein the virtual radio station establishes service criteria selected from the group including user configuration, server, capability, and user subscription, and generates a virtual radio station service in response to the service criteria.

14. A system for generating client-side virtual radio station services, the system comprising:

a radio service client receiver having an interface connected to a network for receiving a plurality of server-supplied transmissions, the receiver decoding the server-supplied transmissions and supplying received radio transmissions at an output; and a virtual radio station having an interface locally connected to the receiver to accept the server-supplied radio stations, the virtual radio station analyzing the content of the server-supplied radio stations using artist-type filter characteristics, selecting artist content from the server-supplied radio stations, and combining the selected artist content from the server-supplied radio stations into a client-side virtual radio station service, the virtual radio station having a user interface to present a list of the selected artist content as stations in the client-side virtual radio station service.

* * * * *